April 24, 1956     B. C. MOWAT     2,743,139
COMPOSITE WHEEL AND TIRE
Filed July 17, 1953
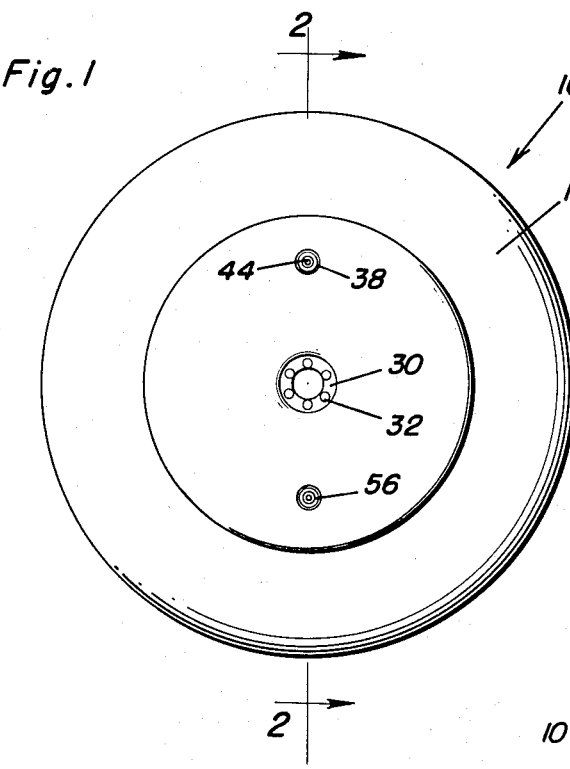
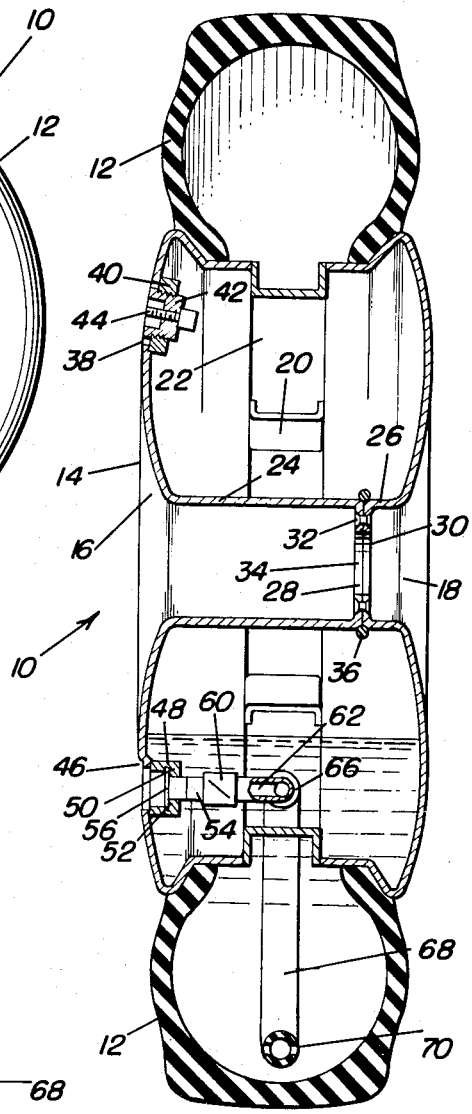
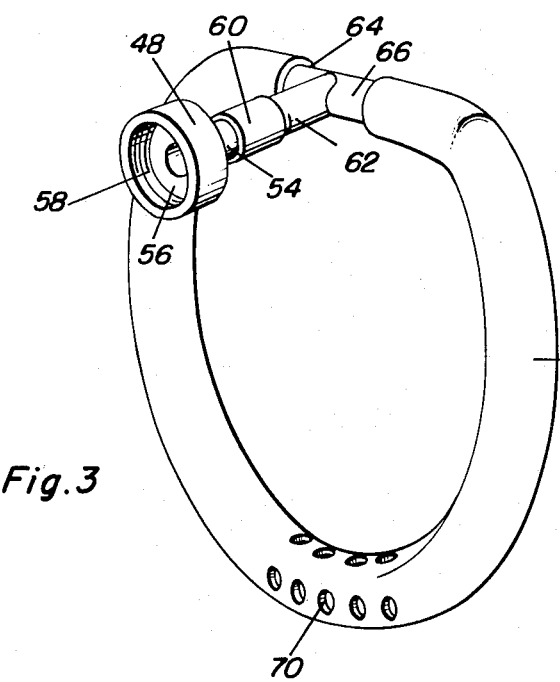
Benona C. Mowat
INVENTOR.

United States Patent Office 2,743,139
Patented Apr. 24, 1956

2,743,139

COMPOSITE WHEEL AND TIRE

Benona C. Mowat, Elkhart, Ind.

Application July 17, 1953, Serial No. 368,720

2 Claims. (Cl. 301—41)

This invention relates to wheel construction and more specifically to a hydraulically weighted composite wheel and tire especially adapted for use on tractors and the like.

The primary object of this invention is to provide a liquid weighted wheel and tire assembly which may be readily filled with air and water or other liquid so as to both maintain the tire at a suitable operating pressure while also providing a variable weight for the wheels of the tractor to insure better traction and more efficient operation of a tractor or like vehicle.

Another primary object of this invention resides in the provision of a composite liquid weighted wheel and tire assembly which eliminates the requirements of a special pressure device for filling the tire with water and permits the tire to be readily filled using a conventional garden hose.

The construction of this invention features a composite wheel and tire formed from a pair of wheel sections which are held together in spaced relationship by suitable spacing members, the hub sections of the wheel sections being joined together to form a bolting plate offset from the center of the wheel to enable adjustment of the wheel gauge of the vehicle by enabling the wheel to be turned over and mounted on the vehicle with the opposite side outward thereby increasing the wheel gauge of the tractor by twice the amount that the bolting plate is offset from the center of the wheel.

Other important features of the invention reside in the provision of means for enabling a simple garden hose to be connected to the wheels whereby any suitable amount of water may be placed in the wheels. It is to be noted that the tires utilized in this invention form a fluid tight wheel with the wheel sections and overlie the space between the wheel sections thus enabling the fluid contained within the composite tire and wheel to readily seek and obtain its level at the lowermost portions of the wheel and tire assembly.

Still further objects and features of this invention reside in the provision of a novel liquid supply assembly which includes a T-fitting having a flexible hose attached thereto extending into the tire proper, the flexible hose being apertured for delivery of water to the tire.

These, together with the various ancillary objects and features of the invention which will become apparent as the following description proceeds are attained by this strong and durable composite wheel and tire as illustrated in the accompanying drawings, by way of example only, wherein:

Figure 1 is a side elevational view of the composite wheel and tire assembly comprising the present invention;

Figure 2 is an enlarged sectional view as taken along the plane of line 2—2 in Figure 1; and Figure 3 is a perspective view of the liquid supplying means forming one of the important elements of this invention.

With continuing reference to the accompanying drawings wherein like reference numerals designate similar parts throughout the various views, reference numeral 10 generally designates the composite wheel and tire comprising the present invention. This device employs a conventional tractor tire such as indicated at 12 formed of the conventional and usual materials and of a conventional size and shape as is generally employed on tractors and like vehicles. However, this tire 12 is positioned in a fluid tight manner on the wheel structure 14. The wheel 14 includes a pair of wheel sections 16 and 18 which are joined together by a plurality of substantially U-shaped spacer members which are welded to the spaced inner edges of the respective wheel sections 16 and 18. The spacer elements 20 hold the wheel sections 16 and 18 in spaced relationship and form in effect a continuous passageway 22 for fluid unbroken except for the spacer elements 20. The wheel sections 16 and 18 are provided with hub sections 24 and 26. The hub section 24 is of substantially greater size than the hub section 26 and both of the hub sections 24 and 26 terminate in abutting plates 28 and 30 which are welded together. Bolt holes as at 32 extend through the bolting plate formed by the abutting plates 28 and 30 and are used in securing the composite wheel and tire about the axle of a tractor, the axle extending through a central aperture 34 in the bolting plate. An O-ring 36 is positioned about the joint between the plates 28 and 30 so as to seal the joint and the hub to eliminate the necessity of completely welding the plates 28 and 30 to each other.

An aperture as at 38 is formed in the wheel section 16 and a valve holding member 40 is welded to the wheel sections 16 overlying the aperture 38. The valve holding member 40 is internally threaded for threaded reception of a valve support element 42 within which a valve assembly 44 is threadedly secured, the valve assembly 44 being of the type conventionally utilized in inner tubes of pneumatic tires. The valve 44 may be utilized to inflate the wheel 10 with air. There is also provided another aperture through the wheel section 16 as indicated at 46. Welded to the wheel section 16 and overlying the aperture 46 is a conduit supporting member 48 provided with a flange 50 having an aperture 52 therethrough. A conduit 54 provided with a head 56 extends through the aperture 52 and is secured to the conduit supporting member 48. The conduit supporting member 48 is internally threaded as at 58 for reception of the male fitting of a conventional garden hose. Threadedly secured and inserted in the conduit 54 is a check valve 60 of conventional design and adapted to permit flow of fluid only inwardly into the composite wheel and tire assembly 10. A T-fitting 62 is threadedly secured to the valve portion 60 of the conduit 54 and secured on the ends 64 and 66 of the cross arm of the T-fitting 60 is a flexible hose member 68 which is provided with a series of hose or apertures 70 medial the ends thereof for delivering fluid introduced into the tube 68 through the conduit 54 and the check valve 60 of the tire 12. The water can, of course, pass upwardly through the opening 22 between the wheel sections 16 and 18.

In use, the tractor wheels utilizing the present invention, can be weighted by introducing water in through the apertures 70, in the tube 68 through the conduit supporting member 48. The pressure in the tires can be increased, if necessary, utilizing the valve 44.

When it is desired to store the composite wheel and tire for the winter and without requiring the addition of an anti-freeze to the liquid within the tire, the water may be removed from the composite wheel and tire assembly by unseating the valve 60 using any suitable tool. Then, air can be added through the valve 44 to maintain sufficient pressure for exhausting any desired amount of fluid.

Of course, the wheel in first position with the opening 52 in a lowermost position and the tube 68, will, of course, remain in a position touching or nearly touching the interior of the tire 12. This intermit positioning of the hose 68 with relation to the inner surface of the tire will, of course, govern the amount of liquid which can be removed from the tire. The hose 68 is made of flexible material in order to flex with the tire during normal use.

Since from the foregoing the construction and advantages of this invention are readily apparent, further description is believed to be unnecessary.

However, since numerous modifications and equivalents of this hydraulically filled wheel assembly would readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A composite wheel and tire comprising a pair of wheel sections provided with outer rim portions, a plurality of spacer elements securing said wheel sections together in spaced relationship, said wheel sections having hub sections secured together in abutting relationship, a tire secured over said rim portions and overlying the space between said wheel sections, and means for supplying fluid to said tire, said means including a connector secured to one of said wheel sections, and a conduit connected to said connector for conveying liquid from said connector to said tire, said conduit including a T-shaped fitting, and a hose, both ends of said hose being secured on said T-fitting, and apertures through said flexible hose medial the ends thereof.

2. A composite wheel and tire comprising a pair of wheel sections provided with outer rim portions, a plurality of spacer elements securing said wheel sections together in spaced relationship, said wheel sections having hub sections secured together in abutting relationship, a tire secured over said rim portions and overlying the space between said wheel sections, and means for supplying fluid to said tire, said means including a connector secured to one of said wheel sections, and a conduit connected to said connector for conveying liquid from said connector to said tire, said conduit including a T-shaped fitting, and a hose, both ends of said hose being secured on said T-fitting, and apertures through said flexible hose medial the ends thereof, the hub section of one of said wheel sections being of greater length than the hub section of the other wheel section, said hub sections being joined to each other in fluid tight seal.

References Cited in the file of this patent

UNITED STATES PATENTS

| | | |
|---|---|---|
| 1,246,443 | Lofland | Nov. 13, 1917 |
| 1,247,681 | Howard | Nov. 27, 1917 |
| 1,562,287 | Bunce | Nov. 17, 1925 |
| 1,710,265 | Llewellyn | Apr. 23, 1929 |
| 2,339,381 | Crowley | Jan. 18, 1944 |

FOREIGN PATENTS

| | | |
|---|---|---|
| 748,262 | France | Apr. 10, 1933 |